(12) United States Patent
Zimmer et al.

(10) Patent No.: US 7,793,090 B2
(45) Date of Patent: Sep. 7, 2010

(54) DUAL NON-VOLATILE MEMORIES FOR A TRUSTED HYPERVISOR

(75) Inventors: Vincent J. Zimmer, Federal Way, WA (US); Mallik Bulusu, Olympia, WA (US); Michael A. Rothman, Puyallup, WA (US); Robert C. Swanson, Olympia, WA (US)

(73) Assignee: Intel Corporation, Santa Clara, CA (US)

( * ) Notice: Subject to any disclaimer, the term of this patent is extended or adjusted under 35 U.S.C. 154(b) by 607 days.

(21) Appl. No.: 11/897,469

(22) Filed: Aug. 30, 2007

(65) Prior Publication Data

US 2009/0064274 A1    Mar. 5, 2009

(51) Int. Cl.
*G06F 15/177* (2006.01)

(52) U.S. Cl. ............................. 713/2; 713/1; 713/100; 726/2; 726/4

(58) Field of Classification Search .................. 713/1, 713/2, 100; 726/2
See application file for complete search history.

(56) References Cited

U.S. PATENT DOCUMENTS

2006/0156008 A1*  7/2006  Frank .................... 713/176
2008/0147555 A1*  6/2008  Cromer et al. ............... 705/52

OTHER PUBLICATIONS

Intel, "Intel® Platform Innovation Framework for EFI Architecture Specification," Sep. 16, 2003, pp. 1-119.

* cited by examiner

*Primary Examiner*—Nitin C Patel
(74) *Attorney, Agent, or Firm*—Trop, Pruner & Hu, P.C.

(57) ABSTRACT

In one embodiment, the present invention includes a method for executing a first code portion of a pre-boot environment from a first non-volatile memory, authenticating a trusted hypervisor in the first non-volatile memory using the first code portion, executing the trusted hypervisor if the trusted hypervisor is authenticated, and authenticating a basic input/output system (BIOS) present in a second non-volatile memory with the trusted hypervisor and transferring control from the trusted hypervisor to the BIOS if the BIOS is authenticated. Other embodiments are described and claimed.

15 Claims, 2 Drawing Sheets

DUAL NON-VOLATILE MEMORIES FOR A TRUSTED HYPERVISOR

BACKGROUND

In many computer systems, a booting of the system occurs through a series of steps in which initialization is performed, self testing occurs, a basic input/output system (BIOS) is loaded and executed, and finally control may be passed off to an operating system (OS). In some systems, a so-called hypervisor (HV), which is a virtualization tool to enable execution of virtual machines on the platform hardware, can be present.

Some of these hypervisors may be third-party trusted hypervisors. In current late-launch trusted environments, several issues are raised. Specifically, such environments still depend on original equipment manufacturer (OEM) firmware, the trusted hypervisor is launched typically from an untrusted source, and the hypervisor is often not the first agent to launch. Oftentimes, hypervisors are launched from disk across a network, or other vulnerable media such that the HV image can be damaged or untrusted code inserted. Furthermore, a late launch from an untrusted disk does not offer delete protection.

DETAILED DESCRIPTION

In various embodiments, redundant flash memories may be provided to optionally launch a third party trusted hypervisor (HV). In some implementations, such launching may be implemented in tandem with Unified Extensible Firmware Interface (UEFI)-based platform code, as such as in accordance with the UEFI Specification Version 2.0 (dated Feb. 21, 2006). More specifically, a modal boot may occur such that code of two different non-volatile memories may be executed serially. For example, code of a first flash memory that includes a minimal amount of OEM firmware to launch a trusted environment and then a trusted hypervisor may first be executed, while the second flash memory may include a fully-featured product BIOS. Accordingly, the first flash memory, which may also be referred herein as a read-only memory (ROM), i.e., first ROM, may provide for assertion of a trusted HV payload. After such launch, the second ROM, i.e., the full product BIOS may be invoked. Note that in various implementations, the second ROM may include a mirror of the first ROM contents. That is, code other than the trusted hypervisor of the first ROM may be present in both ROMs. In this way, by having the first ROM launch the trusted HV and the second ROM act as a full BIOS, there is no need for the HV to carry a limited version of a guest BIOS. Instead, the second ROM may effectively have the full BIOS capability, able to operate in both a bare hardware environment and a guest environment.

Figure 1:
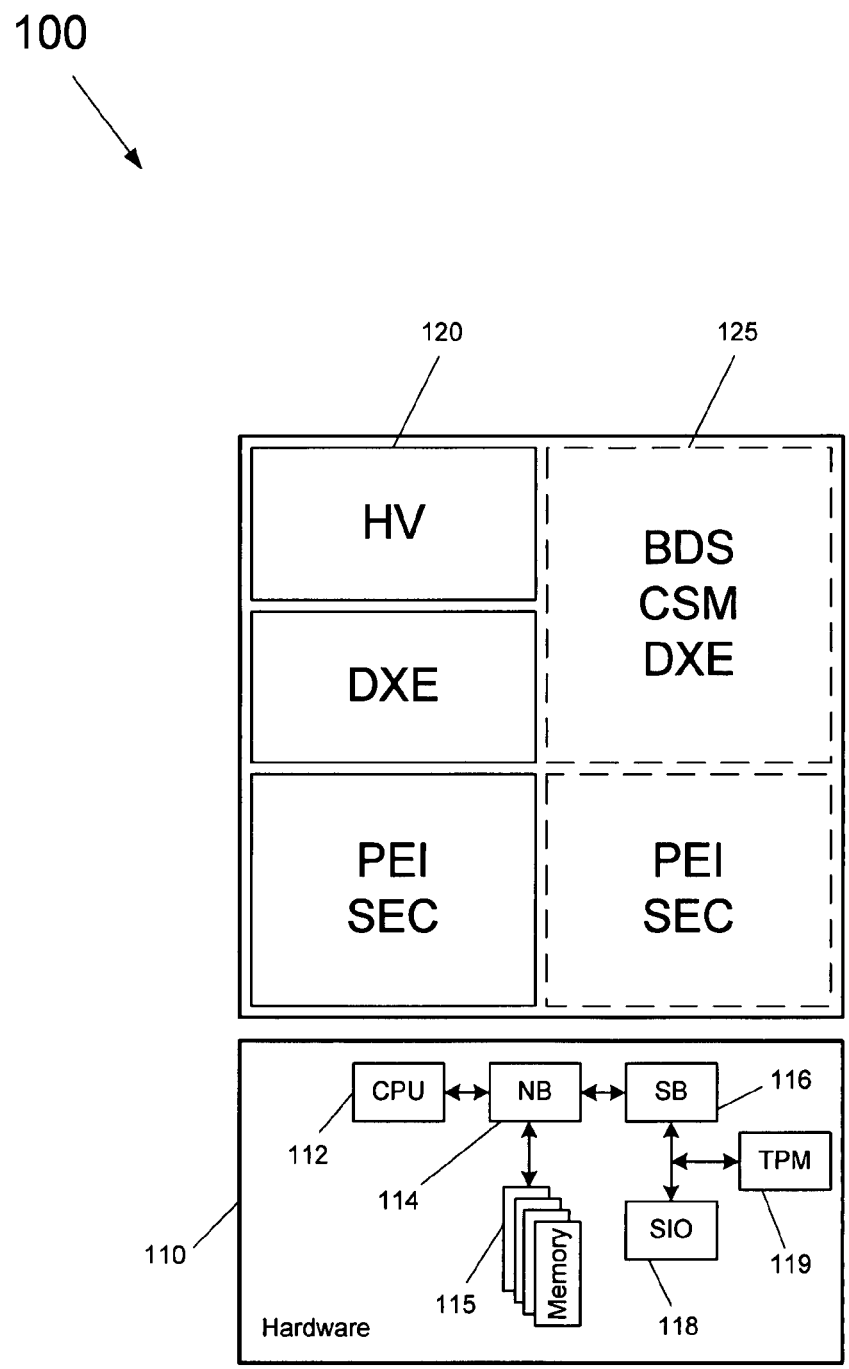
FIG. 1 is a block diagram of a system in accordance with one embodiment of the present invention.

Referring now to FIG. 1, shown is a block diagram of a system in accordance with one embodiment of the present invention. As shown in FIG. 1, system 100 includes a platform having hardware 110. Shown in the embodiment of FIG. 1, hardware 110 includes a processor, namely a central processing unit (CPU) 112, a first chipset component 114, which may be referred to as a north bridge or memory controller, to which is coupled to a plurality of memory modules 115, e.g., dual inline memory modules (DIMMs). First chipset component 114 may also be coupled to a second chipset component 116, such as an input/output (IO) controller such as a south bridge device to which is coupled 10 devices 118 and a trusted platform module (TPM) 119.

Referring still to FIG. 1, in addition a first ROM 120 and a second ROM 125 are present. In various embodiments, first and second ROM's may be redundant flash memories, although the scope of the present invention is not limited in this regard. In the embodiment of FIG. 1, first ROM 120 may include various software modules, including various firmware components, namely minimal OEM firmware such as a security firmware component (SEC), a pre-extensible firmware interface (EFI) initialization (PEI) and driver execution environment (DXE) firmware portions, along with a hypervisor, which may be a secure hypervisor. Second ROM 125 may similarly include the minimal OEM firmware, however, this minimal firmware is provided in the context of a full BIOS image that further includes a compatibility support module (CSM) and boot device select (BDS) module.

In various embodiments, booting of a system may occur first by executing code in first ROM 120 to provide a basic initialization of the platform. After this code is executed, the module boot process may proceed to second ROM 125 that has a fully featured BIOS. In some embodiments, first ROM 120 may be a NOR-based flash, while second ROM 125 may be a NAND-based flash.

Figure 2:
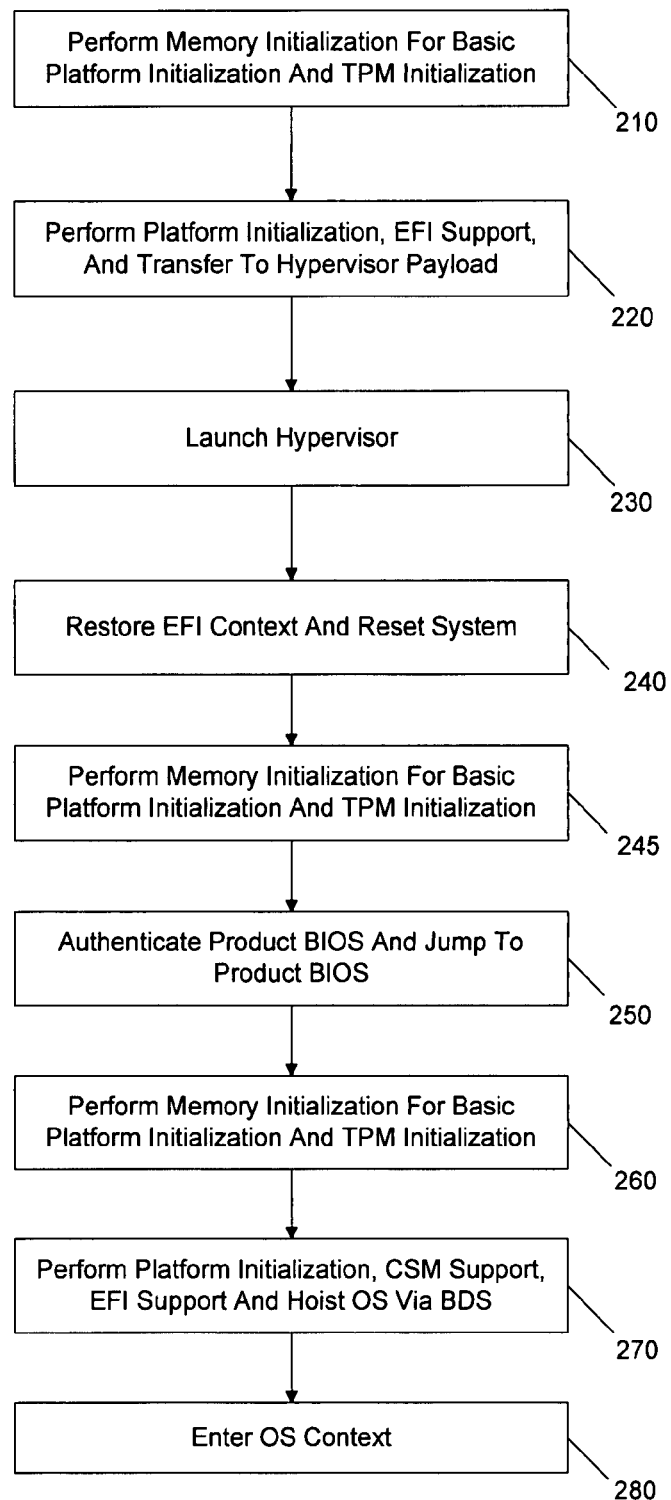
FIG. 2 is a flow diagram of a method in accordance with one embodiment of the present invention.

Referring now to FIG. 2, shown is a flow diagram of a method in accordance with one embodiment of the present invention. As shown in FIG. 2, first an initialization process, which may be a minimal initialization to provide memory initialization and bare platform initialization, along with TPM initialization may be performed (block 210). Then a platform initialization may proceed to provide EFI support and transfer control to the hypervisor payload (block 220). Next, at block 230 the hypervisor itself may be launched. In the hypervisor context, various operations may occur. Then, a user request may restore an EFI context and reset the system (block 240).

Still referring to FIG. 2, another initialization process, which may be another minimal initialization to provide memory initialization and bare platform initialization may be performed (block 245), although this step may be optional in some embodiments. Still in this hypervisor context, the product BIOS, i.e., the second ROM, may be authenticated and then control may pass to the second ROM, i.e., the product BIOS (block 250).

Still referring to FIG. 2, control passes from block 250 to block 260 in which another initialization process may be performed (block 260). Note that in various embodiments, block 260 may be optional. Control then passes to block 270, where the full BIOS may be executed. Accordingly, platform initialization may be performed, as well as CSM support for option programmable read-only memories (OPROMs), legacy boot operations may occur and so forth. Still further, EFI support and hoisting to an OS may occur via a BDS module. From block 270, control passes to block 280, where an OS context may be entered, such as a given commercial OS. While shown with this particular embodiment in the implementation of FIG. 2, the scope of the present invention is not limited in this regard.

While the scope of the present invention is not limited in this regard, the platform initialization and subsequent transfer to the hypervisor payload may include a variety of technologies such as a secure launch control policy (LCP) in which the TPM and a secure initialization authenticated code (AC)

module may authorize the correct payload. Still further, UEFI authenticode-based signed images may be used to authorize the payload, in some embodiments.

Accordingly, in various embodiments, UEFI-based platforms may be more malware/virus resistant than such platforms without embodiments of the present invention. Note that in various embodiments, the HV within the first ROM may be used for various other capabilities. For example, in some embodiments the HV may be used to isolate a DXE implementation for a static OS boot. Still further, the HV may be used as an isolated container to perform trusted firmware updates. Of course other uses of a hypervisor in accordance with an embodiment of the present invention may also be implemented.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
executing a first code portion of a pre-boot environment stored in a first non-volatile memory;
authenticating a trusted hypervisor stored in the first non-volatile memory using the first code portion;
executing the trusted hypervisor if the trusted hypervisor is authenticated; and
authenticating a basic input/output system (BIOS) stored in a second non-volatile memory with the trusted hypervisor and transferring control from the trusted hypervisor to the BIOS if the BIOS is authenticated.

2. The method of claim 1, further comprising authenticating the trusted hypervisor using a trusted platform module.

3. The method of claim 2, further comprising authenticating the BIOS using the trusted platform module.

4. The method of claim 1, wherein the first non-volatile memory and the second non-volatile memory both include the first code portion, the first code portion including security code, pre-execution environment code, and driver execution environment (DXE) code.

5. The method of claim 4, further comprising performing a modal boot by executing the first code portion stored in the first non-volatile memory, authenticating the trusted hypervisor, authenticating the BIOS using the trusted hypervisor, then executing the first code portion stored in the second non-volatile memory and thereafter executing the BIOS.

6. The method of claim 4, wherein the first non-volatile memory is a NOR-based flash memory and the second non-volatile memory is a NAND-based flash memory.

7. The method of claim 4, further comprising using the trusted hypervisor for a trusted firmware update.

8. The method of claim 4, further comprising using the trusted hypervisor to isolate the driver execution environment for a static operating system (OS) boot.

9. An article comprising non-transitory a machine-accessible medium including instructions that when executed cause a system to:
execute a first code portion of a pre-boot environment stored in a first non-volatile memory;
authenticate a trusted hypervisor stored in the first non-volatile memory using the first code portion;
execute the trusted hypervisor if the trusted hypervisor is authenticated; and
authenticate a basic input/output system (BIOS) stored in a second non-volatile memory with the trusted hypervisor and transfer control from the trusted hypervisor to the BIOS if the BIOS is authenticated.

10. The article of claim 9, further comprising instructions that when executed cause the system to authenticate the trusted hypervisor using a trusted platform module.

11. The article of claim 10, further comprising instructions that when executed cause the system to authenticate the BIOS using the trusted platform module.

12. The article of claim 9, further comprising instructions that when executed cause the system to perform a modal boot by execution of the first code portion stored in the first non-volatile memory, authentication of the trusted hypervisor, authentication of the BIOS using the trusted hypervisor, then execution of the first code portion stored in the second non-volatile memory and thereafter execution of the BIOS.

13. A system comprising:
a processor;
a first non-volatile memory including a first code portion of a pre-boot environment and a trusted hypervisor;
a second non-volatile memory including the first code portion and a basic input/output (BIOS); and
a dynamic random access memory (DRAM) including instructions that when executed enable the system to execute the first code portion stored in the first non-volatile memory, authenticate the trusted hypervisor using the first code portion, execute the trusted hypervisor if the trusted hypervisor is authenticated, and authenticate the basic input/output system (BIOS) stored in the second non-volatile memory with the trusted hypervisor and transfer control from the trusted hypervisor to the BIOS if the BIOS is authenticated.

14. The system of claim 13, wherein the DRAM further includes instructions that when executed cause the system to use the trusted hypervisor for a trusted firmware update.

15. The system of claim 13, wherein the DRAM further includes instructions that when executed cause the system to use the trusted hypervisor to isolate a driver execution environment for a static operating system (OS) boot.

* * * * *

UNITED STATES PATENT AND TRADEMARK OFFICE
CERTIFICATE OF CORRECTION

PATENT NO. : 7,793,090 B2  Page 1 of 1
APPLICATION NO. : 11/897469
DATED : September 7, 2010
INVENTOR(S) : Vincent J. Zimmer et al.

It is certified that error appears in the above-identified patent and that said Letters Patent is hereby corrected as shown below:

In the claims:
Column 4, claim 9
Line 11, "non-transitory a" should read --a non-transitory--.

Signed and Sealed this

Twelfth Day of October, 2010

David J. Kappos
*Director of the United States Patent and Trademark Office*